United States Patent
Okamoto (10) Patent No.: US 9,682,508 B2
(45) Date of Patent: Jun. 20, 2017

(54) MOLDING MACHINE AND DRIVING METHOD THEREOF

(71) Applicant: Toshiba Kikai Kabushiki Kaisha, Chiyoda-ku, Tokyo-to (JP)

(72) Inventor: Toshihito Okamoto, Numazu (JP)

(73) Assignee: TOSHIBA KIKAI KABUSHIKI KAISHA, Tokyo-To (JP)

( * ) Notice: Subject to any disclaimer, the term of this patent is extended or adjusted under 35 U.S.C. 154(b) by 198 days.

(21) Appl. No.: 14/602,758

(22) Filed: Jan. 22, 2015

(65) Prior Publication Data

US 2015/0209990 A1 Jul. 30, 2015

(30) Foreign Application Priority Data

Jan. 24, 2014 (JP) ................................. 2014-011018
Jan. 24, 2014 (JP) ................................. 2014-011022

(51) Int. Cl.
*B29C 45/80* (2006.01)
*B29C 45/66* (2006.01)

(52) U.S. Cl.
CPC .............. *B29C 45/80* (2013.01); *B29C 45/66* (2013.01); *B29C 45/661* (2013.01); *B29C 2045/665* (2013.01); *B29C 2945/76096* (2013.01); *B29C 2945/76581* (2013.01); *B29C 2945/76709* (2013.01)

(58) Field of Classification Search
CPC ................... B29C 2945/76709; B29C 45/661
See application file for complete search history.

(56) References Cited

U.S. PATENT DOCUMENTS

| 4,828,473 A | 5/1989 | Otake et al. |
| 6,157,158 A * | 12/2000 | Ishikawa ................. B29C 45/66 264/40.5 |
| 7,210,918 B2 * | 5/2007 | Watanabe ........... B29C 45/1751 425/150 |
| 2004/0219258 A1 | 11/2004 | Weinmann et al. |

FOREIGN PATENT DOCUMENTS

| CN | 1100658 | 2/2003 |
| CN | 1398218 | 2/2003 |

OTHER PUBLICATIONS

Chinese Office Action (with English Language Translation) issued in CN Application No. 201510019550.2 dated Dec. 15, 2016.
English Language Abstract and English Language Translation of CN 1100658 published Feb. 5, 2003.
English Language Abstract and English Language Translation of CN 1398218 published Feb. 19, 2003.

* cited by examiner

*Primary Examiner* — Jill Heitbrink
(74) *Attorney, Agent, or Firm* — DLA Piper LLP US (57) ABSTRACT

A molding machine includes; a fixed platen capable of having a fixed mold attached thereto; a moving platen capable of having a moving mold attached thereto; a mold clamping mechanism clamping the moving mold and the fixed mold with each other by moving the moving mold; a driving unit operating the mold clamping mechanism; and a control unit controlling the driving unit, wherein the control unit compensates an operation loss of the driving unit occurring from an operation start of the driving unit to an operation start of the moving mold to set the moving mold at a desired position.

17 Claims, 9 Drawing Sheets

MOLDING MACHINE AND DRIVING METHOD THEREOF

CROSS REFERENCE TO RELATED APPLICATIONS

This application is based upon and claims the benefit of priority from the prior Japanese Patent Applications No. 2014-011018, filed on Jan. 24, 2014 and No. 2014-011022, filed on Jan. 24, 2014, the entire contents of which are incorporated herein by reference.

BACKGROUND OF THE INVENTION

Field of the Invention

The embodiments of the present invention relate to a molding machine and a driving method thereof.

Related Art

In injection molding, when a melted resin is filled at a high temperature in molds being in complete contact with each other, molecular orientation may occur in the resin. In such a case, a distortion may occur in a molded object. Therefore, in the injection molding, there is a case where an injection molding machine temporarily brings a moving mold into contact with a fixed mold and then slightly separates the moving mold from the fixed mold. After filling a resin in the molds, the injection molding machine performs an operation to bring the moving mold into close contact with the fixed mold. This prevents the molecular orientation from easily occurring in the resin and reduces a stress remaining in the molded object. Such an injection molding method is adopted particularly in foam molding.

Meanwhile, a toggle mechanism that operates a moving mold has a link mechanism including a plurality of links coupled to one another and a ball screw that operates the link mechanism. Therefore, there is play of toggle pins at link connection portions, play between grooves and threads of the ball screw, or the like as backlash or lost motion. The "play" leads to an error in the interval between the molds. Accordingly, at the time of injection molding, even when the injection molding machine intends to separate the moving mold from the fixed mold by a predetermined interval, there is a case where the moving mold is not separated from the fixed mold as expected due to the "play". In this case, a resin pressure or a foam pressure is applied to the molds during injection of the resin and thus the moving mold is separated from the fixed mold during the injection of the resin. When the moving mold is displaced during the injection in this way, an expected resin amount or foam amount cannot be obtained, which increases the possibility that the molded object becomes defective.

The present invention has been achieved to solve the above problems and an object of the present invention is to provide a molding machine and a driving method thereof that can accurately control an opening amount of molds without requiring any special mechanism or apparatus to be added thereto.

SUMMARY OF THE INVENTION

A molding machine according to an embodiment includes: a fixed platen capable of having a fixed mold attached thereto; a moving platen capable of having a moving mold attached thereto; a mold clamping mechanism clamping the moving mold and the fixed mold with each other by moving the moving mold; a driving unit operating the mold clamping mechanism; and a control unit controlling the driving unit, wherein the control unit compensates an operation loss of the driving unit occurring from an operation start of the driving unit to an operation start of the moving mold to set the moving mold at a desired position.

When the moving mold and the fixed mold are to be spaced apart by an interval Ds, the control unit may operate the driving unit by as much as $(Es+\Delta E)$ or $(Es+\Delta E+E\alpha)$ from a state where the moving mold and the fixed mold are in contact with each other, and then may return the driving unit by as much as the operation loss $\Delta E$ or $(\Delta E+E\alpha)$, wherein an operation distance or an operation angle of the driving unit corresponding to the interval Ds is assumed as Es, an operation loss of the driving unit occurring from an operation start of the driving unit to an operation start of the moving mold is assumed as $\Delta E$, and a certain operation distance or a certain operation angle of the driving unit is assumed as $E\alpha$.

The machine may further includes: an input unit inputting an interval between the moving mold and the fixed mold, wherein when an actual interval between the moving mold and the fixed mold at a time when the driving unit has operated by a certain distance or angle Ep is Dp, the control unit calculates a distance or angle Ep0 of the driving unit corresponding to the actual interval Dp input by the input unit and calculates a difference $(|Ep-Ep0|)$ between the distance or angle Ep0 and the distance or angle Ep as the operation loss $\Delta E$.

The machine may further include a memory storing the operation loss $\Delta E$.

The mold clamping mechanism may include a toggle mechanism having a plurality of links coupled to one another.

The mold clamping mechanism may include a ball screw moving the moving platen.

The machine may further include an encoder detecting a position or angle of the driving unit.

A driving method of a molding machine according to an embodiment, the molding machine including a fixed platen capable of having a fixed mold attached thereto, a moving platen capable of having a moving mold attached thereto, a mold clamping mechanism clamping the moving mold and the fixed mold with each other by moving the moving mold, a driving unit operating the mold clamping mechanism, and a control unit controlling the driving unit, the method includes compensating an operation loss of the driving unit occurring from an operation start of the driving unit to an operation start of the moving mold to set the moving mold at a desired position.

The method may further includes: when the moving mold and the fixed mold are to be spaced apart by an interval Ds, operating the driving unit by as much as $(Es+\Delta E)$ or $(Es+\Delta E+E\alpha)$ from a state where the moving mold and the fixed mold are in contact with each other; and returning the driving unit by as much as the operation loss $\Delta E$ or $(\Delta E+E\alpha)$, wherein an operation distance or an operation angle of the driving unit corresponding to the interval Ds is assumed as Es, an operation loss of the driving unit occurring from an operation start of the driving unit to an operation start of the moving mold is assumed as $\Delta E$, and a certain operation distance or a certain operation angle of the driving unit is assumed as $E\alpha$.

When an actual interval between the moving mold and the fixed mold at a time when the driving unit has operated by a certain distance or angle Ep is Dp, the control unit may calculate a distance or angle Ep0 of the driving unit corresponding to the actual interval Dp and may calculate a difference (|Ep−Ep0|) between the distance or angle Ep0 and the distance or angle Ep as the operation loss ΔE.

A molding machine according to an embodiment includes: a fixed platen capable of having a fixed mold attached thereto; a moving platen capable of having a moving mold attached thereto; a mold clamping mechanism clamping the moving mold and the fixed mold with each other by moving the moving mold; a driving unit operating the mold clamping mechanism; and a control unit controlling the driving unit, wherein the control unit calculates an operation loss ΔE of the driving unit occurring from an operation start of the driving unit to an operation start of the moving mold based on a torque T or a consumed power of the driving unit.

The control unit may set an operation amount of the driving unit to a time when a torque T or a consumed power of the driving unit becomes a peak after the driving unit starts operating as the operation loss ΔE.

When the moving mold and the fixed mold are to be spaced apart by an interval Ds, the control unit may operate the driving unit by as much as (Es+ΔE) or (Es+ΔE+Eα) from a state where the moving mold and the fixed mold are in contact with each other, and then may return the driving unit by as much as the operation loss ΔE or (ΔE+Eα), wherein an operation distance or an operation angle of the driving unit corresponding to the interval Ds is assumed as Es, an operation loss of the driving unit occurring from an operation start of the driving unit to an operation start of the moving mold is assumed as ΔE, and a certain operation distance or a certain operation angle of the driving unit is assumed as Eα.

The machine may further include a memory storing the operation loss ΔE.

The mold clamping mechanism includes a toggle mechanism having a plurality of links coupled to one another.

The mold clamping mechanism may include a ball screw moving the moving platen.

The machine may further include an encoder detecting a position or angle of the driving unit.

A driving method of a molding machine according to an embodiment, the molding machine including a fixed platen capable of having a fixed mold attached thereto, a moving platen capable of having a moving mold attached thereto, a mold clamping mechanism clamping the moving mold and the fixed mold with each other by moving the moving mold, a driving unit operating the mold clamping mechanism, and a control unit controlling the driving unit, the method includes: calculating an operation loss ΔE of the driving unit occurring from an operation start of the driving unit to an operation start of the moving mold based on a torque T or a consumed power of the driving unit; when the moving mold and the fixed mold are to be spaced apart by an interval Ds, operating the driving unit by as much as (Es+ΔE) or (Es+ΔE+Eα) from a state where the moving mold and the fixed mold are in contact with each other; and returning the driving unit by as much as the operation loss ΔE or (ΔE+Eα), wherein an operation distance or an operation angle of the driving unit corresponding to the interval Ds is assumed as Es, an operation loss of the driving unit occurring from an operation start of the driving unit to an operation start of the moving mold is assumed as ΔE, and a certain operation distance or a certain operation angle of the driving unit is assumed as Eα.

When an actual interval between the moving mold and the fixed mold at a time when the driving unit has operated by a certain distance or angle Ep is Dp, the control unit may calculate a distance or angle Ep0 of the driving unit corresponding to the actual interval Dp and may calculate a difference (|Ep−Ep0|) between the distance or angle Ep0 and the distance or angle Ep as the operation loss ΔE.

DETAILED DESCRIPTION OF THE INVENTION

Embodiments will now be explained with reference to the accompanying drawings. The present invention is not limited to the embodiments.

First Embodiment

Figure 1:
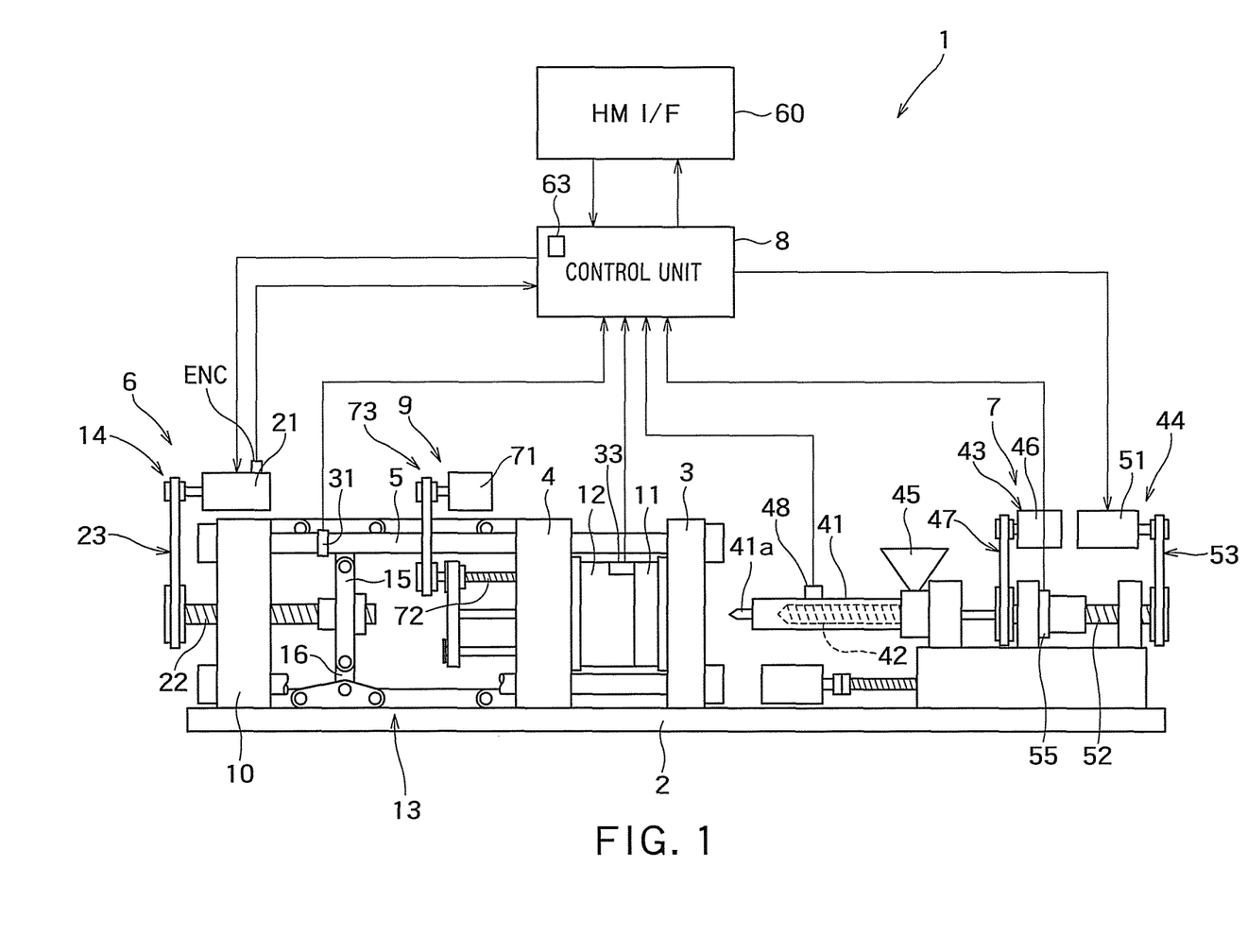
FIG. 1 shows an example of a configuration of an injection molding machine 1 according to a first embodiment.

FIG. 1 shows an example of a configuration of an injection molding machine 1 according to a first embodiment. The injection molding machine 1 includes a frame 2, a fixed platen 3, a moving platen 4, a tie bar 5, a clamp driving mechanism 6, an injection device 7, a control unit 8, an extrusion mechanism 9, and a human machine interface (HMI/F) 60.

The frame 2 is a base of the injection molding machine 1. The fixed platen 3 is fixed onto the frame 2. A fixed mold 11 is attached to the fixed platen 3. One end of the tie bar 5 is fixed to the fixed platen 3 and the other end thereof is fixed to a support platen 10. The tie bar 5 extends from the fixed platen 3 to the support platen 10 through the moving platen 4.

The moving platen 4 is mounted on a linear guide (not shown) provided on the frame 2. The moving platen 4 is guided by the tie bar 5 or the linear guide and can move toward the fixed platen 3 or away from the fixed platen 3. A moving mold 12 is attached to the moving platen 4. The moving mold 12 faces the fixed mold 11 and approaches the fixed mold 11 together with the moving platen 4 to be combined with the fixed mold 11. When the moving mold 12 and the fixed mold 11 are combined and mold closed, a space corresponding to a product shape is formed between the moving mold 12 and the fixed mold 11.

The clamp driving mechanism 6 includes a toggle mechanism 13 and a toggle-mechanism driving unit 14. The toggle-mechanism driving unit 14 includes a clamping servomotor 21, a ball screw 22, and a transmission mechanism 23 to drive the toggle mechanism 13. A crosshead 15 is attached to a head portion of the ball screw 22. When the ball screw 22 rotates, the crosshead 15 moves toward the moving platen 4 or away from the moving platen 4. The transmission mechanism 23 transmits rotation of the clamping servomotor 21 to the ball screw 22 to move the crosshead 15. An encoder ENC is provided in the servomotor 21 to detect a position (an angle) of a rotor of the servomotor 21. The encoder ENC transmits a detection value to the control unit 8.

When the toggle-mechanism driving unit 14 moves the crosshead 15, the toggle mechanism 13 is activated. For example, when the crosshead 15 moves toward the moving platen 4, the moving platen 4 moves toward the fixed platen 3, whereby mold closing is performed. When the crosshead 15 moves away from the moving platen 4, the moving platen 4 moves away from the fixed platen 3, whereby mold opening is performed.

The extrusion mechanism 9 includes an extrusion servomotor 71, a ball screw 72, and a transmission mechanism 73 to take a molded product out of the moving mold 12. A head portion of the ball screw 72 penetrates through an internal surface of the moving mold 12. When the ball screw 72 rotates, the ball screw 72 extrudes the product adhering to the internal surface of the moving mold 12. The transmission mechanism 73 transmits rotation of the extrusion servomotor 71 to the ball screw 72 to move the ball screw 72 in lateral directions in FIG. 1. The molds 11 and 12 are designed in such a manner that the molded product adheres to the moving mold 12.

The injection molding machine 1 further includes an elongation amount sensor 31 that detects an elongation amount of the tie bar 5, and a pressure sensor 33 that detects a clamping force between the fixed mold 11 and the moving mold 12. Information related to a clamping state (a mold closing state) is detected by the elongation amount sensor 31. The elongation amount sensor 31 transmits the elongation amount of the tie bar 5 to the control unit 8 and the pressure sensor 33 transmits the clamping force to the control unit 8. The control unit 8 can calculate a clamping force using the elongation amount of the tie bar 5 transmitted from the elongation amount sensor 31. In this case, the pressure sensor 33 is not required. A sensor that detects the number of rotations or a torque of the clamping servomotor 21 can be arranged instead of the elongation amount sensor 31 or together with the elongation amount sensor 31. The control unit 8 can calculate the elongation amount or the clamping force from information such as the number of rotations or the torque of the clamping servomotor 21. The control unit 8 controls driving of the clamping servomotor 21 based on the elongation amount or the clamping force of the tie bar 5.

The injection device 7 includes a heating barrel (band heater) 41, a screw 42, a measurement unit 43, and an injection-device driving unit 44. The heating barrel 41 includes a nozzle 41a that injects a melted material into the molds and is connected to a hopper 45. The screw 42 is provided to be movable in the heating barrel 41.

The injection molding machine 1 further includes a temperature sensor 48 that detects a temperature of the heating barrel 41. The temperature sensor 48 transmits the temperature of the heating barrel 41 to the control unit 8. The control unit 8 controls a power to be supplied to the heating barrel 41 based on the temperature of the heating barrel 41.

The measurement unit 43 has a measurement servomotor 46, and a transmission mechanism 47 that transmits rotation of the measurement servomotor 46 to the screw 42. When the measurement servomotor 46 is driven and the screw 42 is rotated in the heating barrel 41, a resin as a molding material is introduced from the hopper 45 into the heating barrel 41. The introduced resin is sent toward the head of the heating barrel 41 while being heated and kneaded. The resin is melted and stored in a head portion of the heating barrel 41. The molding material is not limited to the resin and can be any material that can be used as the molding material, such as a metal, a glass, a rubber, or a carbide compound containing carbon fibers.

The injection-device driving unit 44 has an injection servomotor 51, a ball screw 52, and a transmission mechanism 53. When the ball screw 52 is rotated, the screw 42 is moved in the lateral directions in FIG. 1 in the heating barrel 41. The transmission mechanism 53 transmits rotation of the injection servomotor 51 to the ball screw 52. Accordingly, when the injection servomotor 51 is rotated, the screw 42 is moved. The screw 42 extrudes the molding material stored in the head portion of the heating barrel 41 from the nozzle 41a, thereby injecting the molding material from the nozzle 41a.

The injection device 7 includes a pressure sensor 55 that detects an injection pressure of the molding material. The pressure sensor 55 transmits the detected injection pressure value to the control unit 8. The control unit 8 controls driving of the injection servomotor 51 based on the injection pressure value. That is, the control unit 8 controls the injection pressure of the molding material by controlling an advancing speed (an injection speed) of the screw 42.

The HMI/F 60 displays various kinds of information related to the injection molding machine 1. The HMI/F 60 can be, for example, an input/output device including a display unit and a keyboard or can be a touchscreen display. An operator can input settings such as an instruction related to an operation of the injection molding machine 1 through the HMI/F 60. A user inputs a setting value of a maximum injection pressure at an injecting step of the injection device 7, a setting value of the clamping force, an operation mode, and the like.

The control unit 8 monitors information received from the elongation amount sensor 31 at the injecting step and controls the injection device 7 to cause a numerical value obtained from the information not to exceed a preset threshold. The control unit 8 also drives the clamp driving mechanism 6 to compensate "play" such as backlash or lost motion of the toggle mechanism 13 and the ball screw 22. Driving of the clamp driving mechanism 6 will be explained later. The control unit 8 further includes a memory 63 that has parameters required to compensate the "play" stored therein.

Figure 2:
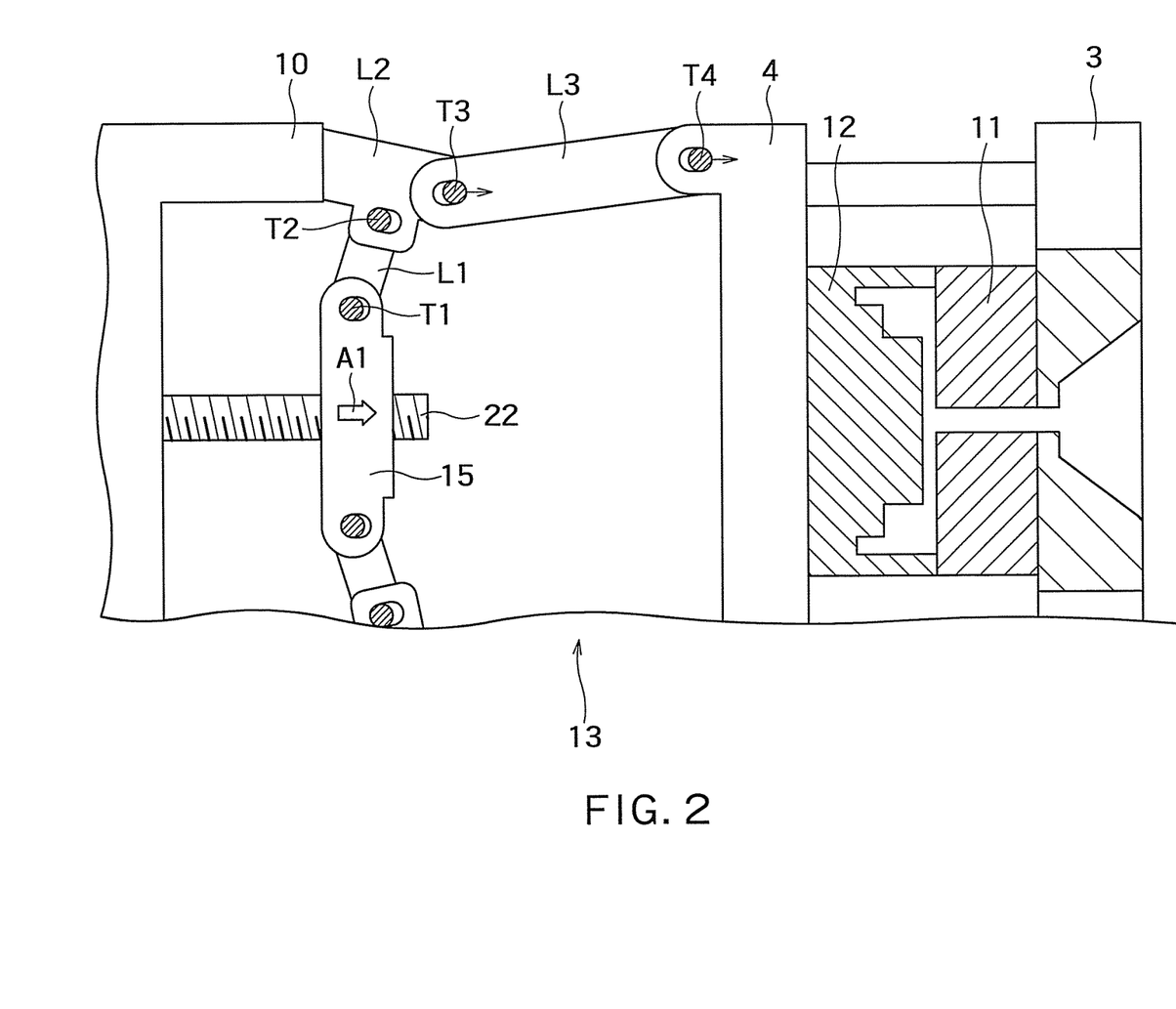
FIGS. 2 and 3 show an operation of the toggle mechanism 13 in more detail.
Figure 3:
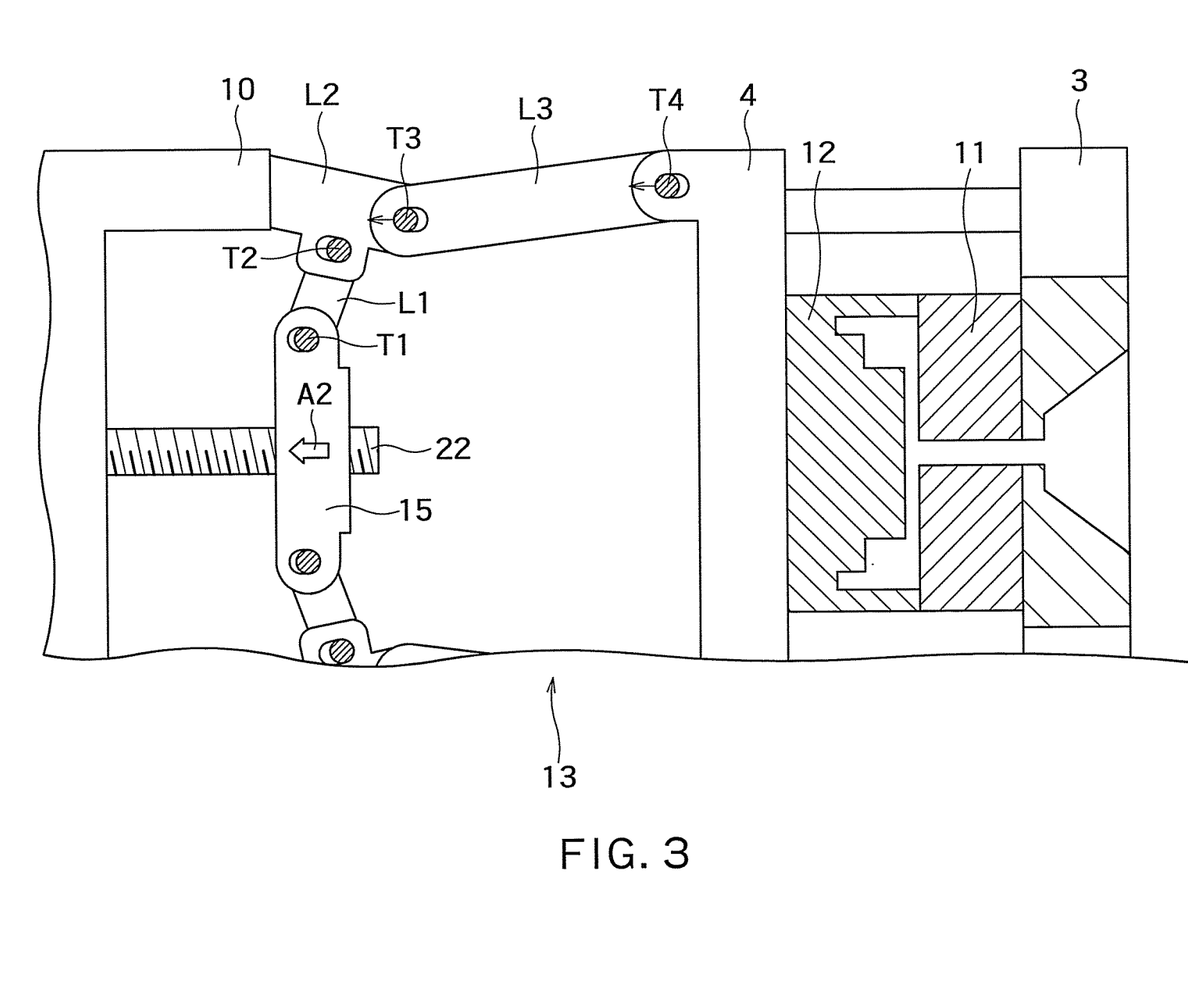

FIGS. 2 and 3 show an operation of the toggle mechanism 13 in more detail. Only an upper portion of the toggle mechanism 13 is explained for convenience. Because an operation of a lower portion of the toggle mechanism 13 can be readily understood from the operation of the upper portion of the toggle mechanism 13, explanations thereof are omitted. The toggle mechanism 13 includes the crosshead 15 and links L1 to L3. The ball screw 22 is coupled to the links L1 to L3 via the crosshead 15. The crosshead 15 is coupled to the support platen 10 and the moving platen 4 via the links L1 to L3. The crosshead 15 is coupled to the link L1 via a toggle pin T1. The link L1 is coupled to the link L2 via a toggle pin T2. The link L2 is coupled to the link L3 via a toggle pin T3. The link L2 is coupled also to the support platen 10. The link L3 is coupled to the moving platen 4 via a toggle pin T4.

When the clamping servomotor (hereinafter, also "motor") 21 shown in FIG. 1 rotates the ball screw 22 and moves the crosshead 15 in a direction shown by an arrow A1 in FIG. 2, the crosshead 15 pushes up the links L1 to L3. The links L2 and L3 thereby extend substantially linearly between the support platen 10 and the moving platen 4. As a result, the moving platen 4 moves toward the fixed platen 3 to cause the moving mold 12 to approach the fixed mold 11.

When the motor 21 reversely rotates the ball screw 22, thereby moving the crosshead 15 in a direction shown by an arrow A2 in FIG. 3, the crosshead 15 moves down the links L1 to L3. The links L2 and L3 thereby form a bend between the support platen 10 and the moving platen 4. As a result, the moving platen 4 moves away from the fixed platen 3 to separate the moving mold 12 from the fixed mold 11.

As shown in FIGS. 2 and 3, the toggle pins T1 to T4 have some play (looseness) to enable the links L1 to L3 to operate. Accordingly, an operation loss (lost motion) occurs when the moving direction of the crosshead 15 (the moving mold 12) is switched from the direction of the arrow A1 to the direction of the arrow A2. Play between grooves and threads of the ball screw 22 also becomes a cause of the operation loss. Such an operation loss indicates an error that the moving mold 12 does not operate although the motor 21 is rotating.

As mentioned above, the operation loss becomes a cause of a failure in the injection molding such as foam molding. Therefore, it is preferable to compensate the operation loss (hereinafter, also denoted by $\Delta E$).

In the first embodiment, when the moving mold 12 and the fixed mold 11 are to be spaced apart by a predetermined interval Ds, the motor 21 does not rotate by an angle Es of the motor 21 corresponding to the interval Ds but rotates by a compensation angle (Es+$\Delta$Es). This enables the moving mold 12 and the fixed mold 11 to be actually spaced apart by the predetermined interval Ds. A rotation direction of the motor 21 in a case where the moving mold 12 is to be separated from the fixed mold 11 is assumed as a first direction. The control unit 8 then rotates the motor 21 in a second direction opposite to the first direction by an angle corresponding to the operation loss $\Delta E$. That is, the motor 21 rotates by the compensation angle (Es+$\Delta$Es) to separate the moving mold 12 from the fixed mold 11 by the interval Ds and then reversely rotates by an angle corresponding to the operation loss $\Delta E$ so as not to move the moving mold 12.

When the motor 21 does not reversely rotate in the second direction after rotating in the first direction, the interval between the moving mold 12 and the fixed mold 11, which is the predetermined interval Ds before filling of a resin, may be enlarged by as much as the operation loss $\Delta E$ due to a resin pressure or a foam pressure during filling of a resin. That is, the interval between the moving mold 12 and the fixed mold 11 becomes larger than the interval Ds during filling of a resin. This hinders an expected resin pressure or foam pressure from being obtained and causes the molded product to be defective.

On the other hand, in the first embodiment, the motor 21 reversely rotates by an angle corresponding to the operation loss $\Delta E$ after rotating in the first direction. That is, the motor 21 compensates the operation loss $\Delta E$ to set the moving mold 12 at a desired position. Accordingly, the interval between the moving mold 12 and the fixed mold 11 is not enlarged and is kept at the predetermined interval Ds during filling of a resin. Therefore, a satisfactory molded product can be formed.

The motor 21 can rotate by an angle (Es+$\Delta$Es+E$\alpha$, for example) equal to or larger than the compensation angle to separate the moving mold 12 from the fixed mold 11 by an interval (Ds+D$\alpha$, for example) equal to or larger than the interval Ds. The angle E$\alpha$ is an operation distance or an operation angle of the motor 21 corresponding to a certain extra interval D$\alpha$ (E$\alpha$>0, D$\alpha$>0). In this case, after rotating by Es+$\Delta$Es+E$\alpha$, the motor 21 reversely rotates by $\Delta E$+E$\alpha$ to return the moving mold 12 by D$\alpha$. Also with this process, the operation loss $\Delta E$ can be compensated and accordingly the effect mentioned above of the first embodiment is not lost.

Calculation of the operation loss $\Delta E$ is explained next.
(Measurement of Actual Interval Dp)

Figure 4A:
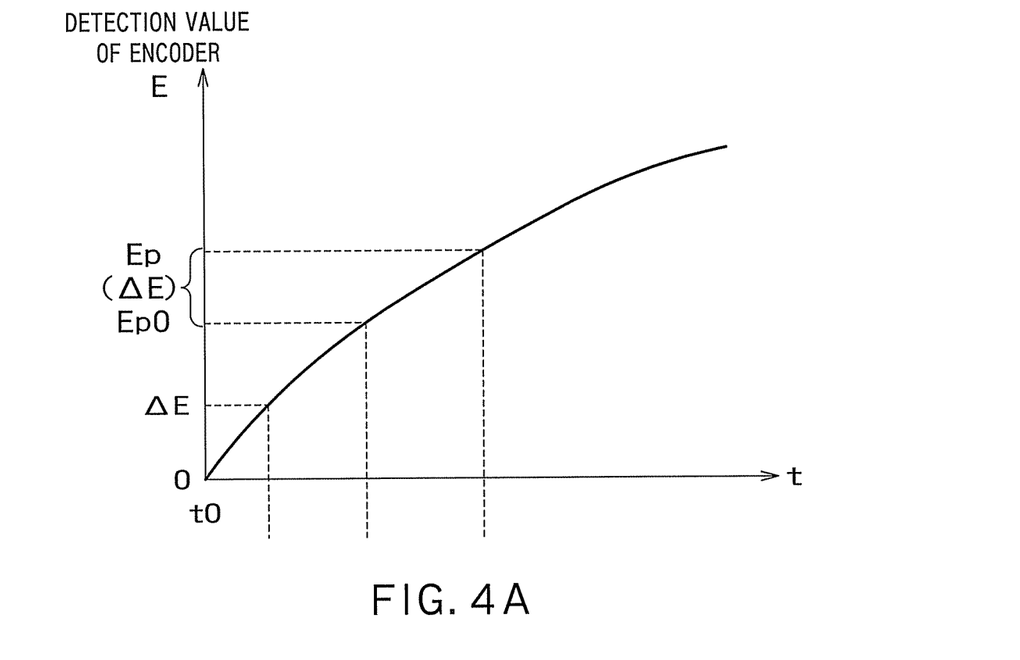
FIGS. 4A and 4B are graphs showing a detection value E of the encoder ENC of the motor 21 and a position D of the moving mold 12, respectively.
Figure 4B:
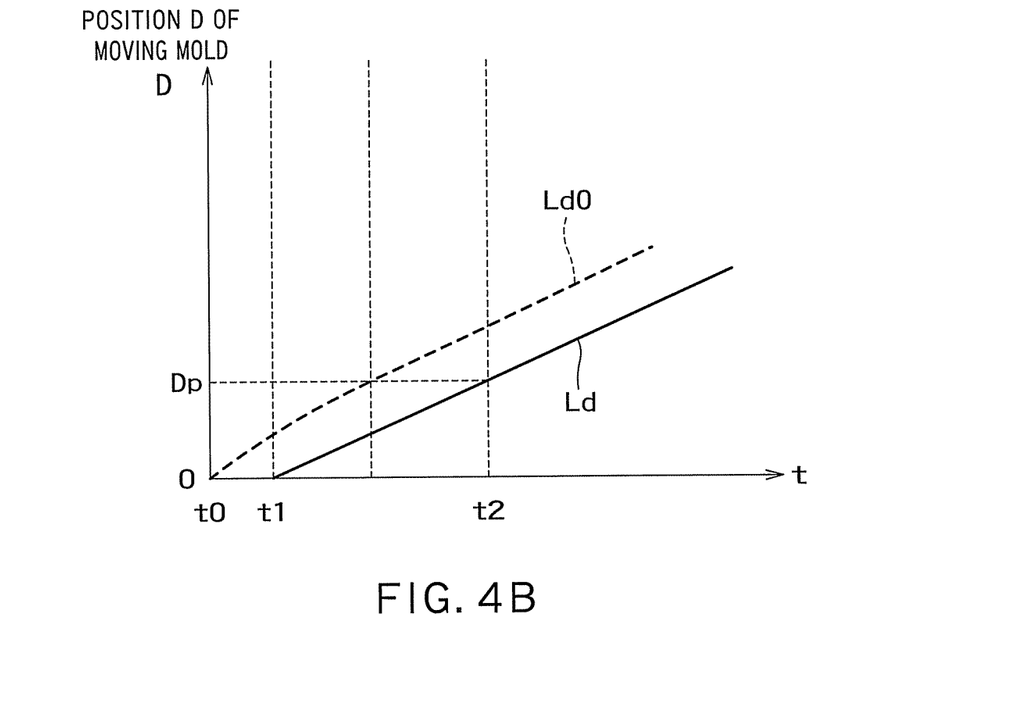
Figure 6:
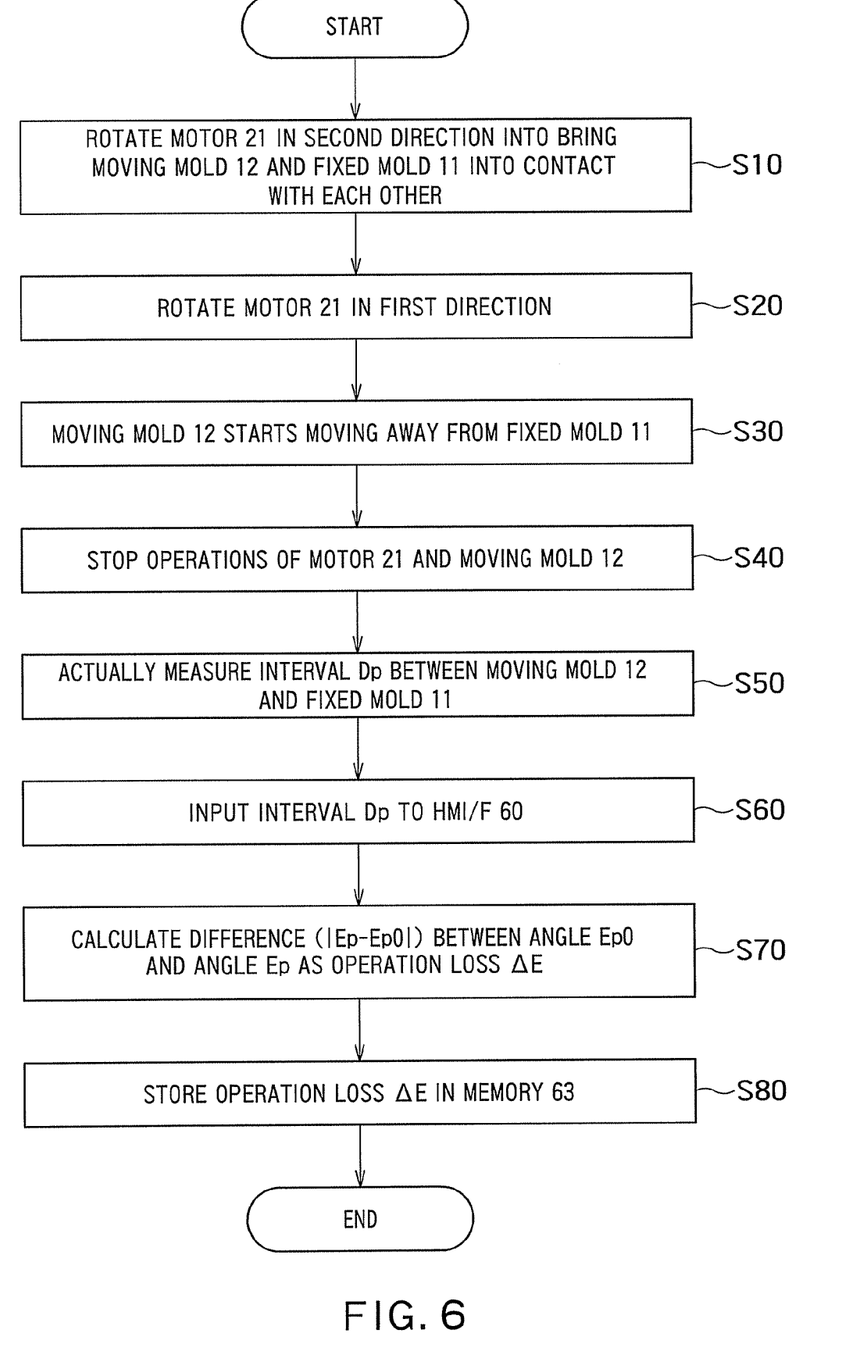
FIG. 6 is a flowchart showing an operation of calculating the actual interval Dp and the operation loss ΔE.

FIGS. 4A and 4B are graphs showing a detection value E of the encoder ENC of the motor 21 and a position D of the moving mold 12, respectively. The horizontal axes represent the time. The encoder ENC detects an actual rotation position (an angle, for example) of the motor 21. The detection value E of the encoder ENC indicates an actual position of the motor 21. A solid line Ld in FIG. 4B shows the actual position of the moving mold 12. A broken line Ld0 shows a position (a set position) of the moving mold 12 expected when there is no operation loss $\Delta E$. FIG. 6 is a flowchart showing an operation of calculating the actual interval Dp and the operation loss $\Delta E$.

To calculate the operation loss $\Delta E$, the actual interval Dp is first measured. The actual interval Dp is an actual interval between the moving mold 12 and the fixed mold 11 measured when the motor 21 has performed a rotation operation by an angle Ep according to a position instruction. The actual interval Dp can be obtained by an operator actually measuring an interval between the moving mold 12 and the fixed mold 11.

For example, the motor 21 is first rotated in the second direction to obtain a state (D=0, E=0) where the moving mold 12 and the fixed mold 11 are in contact with each other (t0, S10). At that time, the toggle pins T1 to T4 are in a state shown in FIG. 2.

Next, after t0, the motor 21 is rotated in the first direction (S20). Because the motor 21 starts the operation, the detection value E of the encoder ENC gradually increases as shown in FIG. 4A.

However, as shown by the solid line Ld in FIG. 4B, the operation of the moving mold 12 is delayed by as much as the operation loss $\Delta E$. The moving mold 12 starts moving away from the fixed mold 11 at t1 (S30). At that time, the toggle pins T1 to T4 are in a state shown in FIG. 3.

The position D of the moving mold 12 then increases with the detection value E of the encoder ENC. That is, the moving mold 12 is separated from the fixed mold 11.

At t2, the operations of the motor 21 and the moving mold 12 are stopped (S40). The operator actually measures the interval Dp between the moving mold 12 and the fixed mold 11 at that time (S50). The operator inputs the measured interval Dp to the HMI/F 60 (S60).

The actual interval Dp can be an average of a plurality of measurement values.
(Calculation of Operation Loss $\Delta E$)

Generally, to move the moving mold 12 to a desired position, the control unit 8 sets a rotation position (an angle, for example) of the motor 21 with a position instruction. Therefore, the position of the motor 21 and the position of the moving mold 12 are associated with each other and a movement distance of the moving mold 12 can be converted into a rotation operation of the motor 21. Therefore, the control unit 8 can calculate the operation loss $\Delta E$ based on the actual interval Dp between the moving mold 12 and the fixed mold 11.

For example, the broken line Ld0 in FIG. 4B shows the position (the set position) of the moving mold 12 in a case where there is no operation loss. Therefore, the control unit 8 calculates a position Ep0 of the motor 21 assuming the actual interval Dp as the set position. It can be seen that the positions Ep0 and Ep are different by as much as the operation loss ΔE. Accordingly, it suffices that the control unit 8 calculates a difference (|Ep−Ep0|) between the angle Ep0 and the angle Ep as the operation loss ΔE (S70). The operation loss ΔE is stored in the memory 63 (S80).

(Injection Molding Using Operation Loss ΔE)

Figure 7:
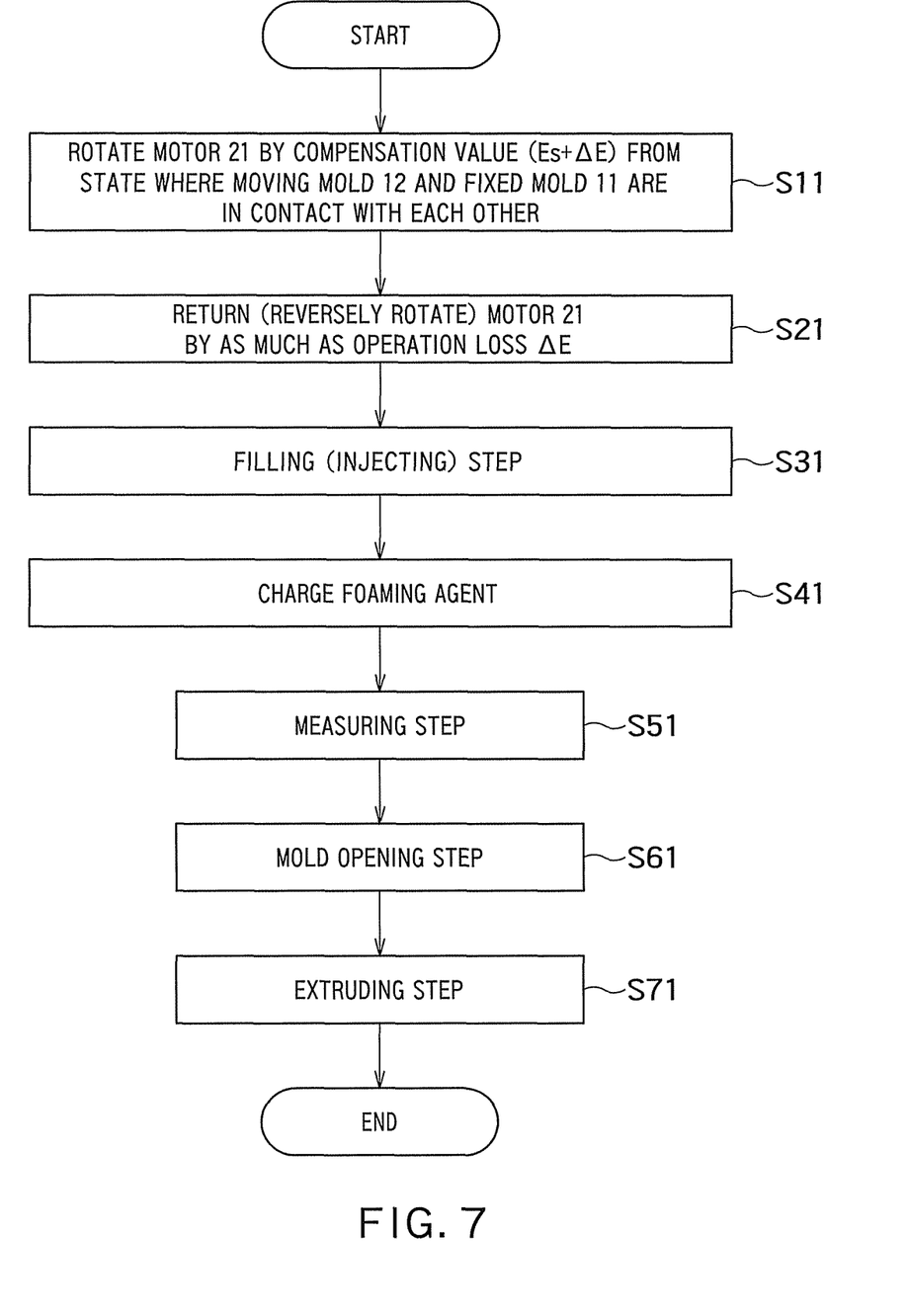
FIG. 7 is a flowchart showing an injection and molding operation of the injection molding machine 1.

FIG. 7 is a flowchart showing an injection and molding operation of the injection molding machine 1. The injection molding machine 1 repeatedly performs cycles of this injection and molding operation with one injection and molding operation as one cycle. Each of the cycles includes a plurality of steps to inject a molding material and mold a product. For example, each of the cycles includes a mold closing step, a filling (injecting) step, a measuring step, a mold opening step, and an extruding step.

The mold closing step is a step of combining the moving mold 12 with the fixed mold 11 to form a space corresponding to a product shape between the moving mold 12 and the fixed mold 11. As mentioned above, in the injection molding such as a foam molding, the control unit 8 brings the moving mold 12 into contact with the fixed mold 11 and then space the moving mold 12 away from the fixed mold 11 by the predetermined interval Ds.

Figure 5A:
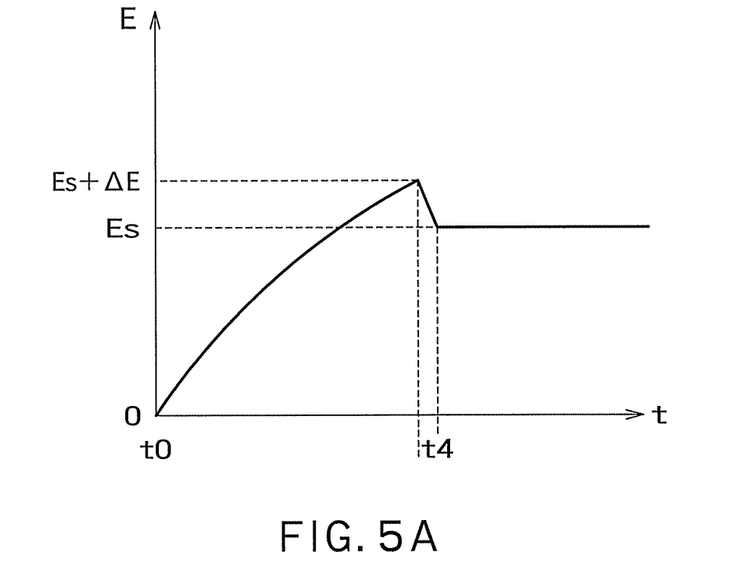
FIGS. 5A and 5B are graphs showing the detection value E of the encoder ENC of the motor 21 and the position D of the moving mold 12 at the mold closing step.
Figure 5B:
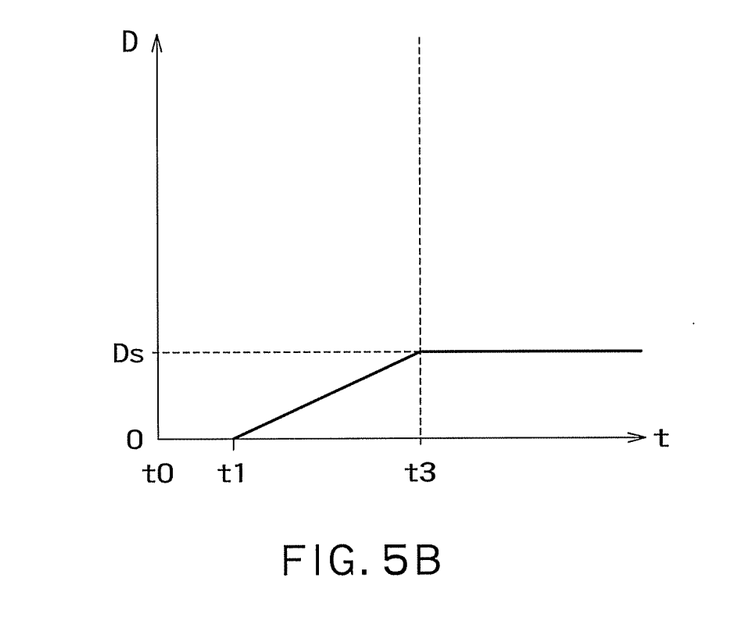

For example, FIGS. 5A and 5B are graphs showing the detection value E of the encoder ENC of the motor 21 and the position D of the moving mold 12 at the mold closing step. Es indicates an operation distance or an operation angle of the motor 21 corresponding to the interval Ds at the time when the moving mold 12 and the fixed mold 11 are to be spaced apart from each other by the predetermined interval Ds. As mentioned above, ΔE indicates the operation loss of the motor 21 occurring from the operation start of the motor 21 to the operation start of the moving mold 12. In this example, the control unit 8 rotates the motor 21 by the compensation value (Es+ΔE) from a state where the moving mold 12 and the fixed mold 11 are in contact with each other (t3, S11). This moves the moving mold 12 by the predetermined interval Ds. The control unit 8 then returns (reversely rotates) the motor 21 by as much as the operation loss ΔE (t4, S21). Accordingly, the interval between the moving mold 12 and the fixed mold 11 is not enlarged and is kept at the predetermined interval Ds during filling of a resin. That is, the motor 21 compensates the operation loss ΔE to set the moving mold 12 at a desired position.

As described above, the motor 21 can, for example, rotate by Es+ΔEs+Eα to space the moving mold 12 away from the fixed mold 11 by the interval Ds+Dα and then reversely rotate by ΔE+Eα to return the moving mold 12 by Dα. This can also compensate the operation loss ΔE.

The filling (injecting) step is a step of pressing the nozzle 41a in FIG. 1 against a through hole of the fixed mold 11 and injecting a molding material melted by the heating barrel 41 into a space between the moving mold 12 and the fixed mold 11 (S31). At that time, the control unit 8 drives the injection servomotor 51 to rotate the ball screw 52. This causes the screw 42 in the heating barrel 41 to be pushed toward the molds 11 and 12. The screw 42 injects the molding material stored in the head portion of the heating barrel 41 into the space between the moving mold 12 and the fixed mold 11. In the case of the foam molding, a foaming agent is charged via the heating barrel 41 or the screw 42 at the same time as the injection of the molding material or after thereof (S41).

The measuring step is a step of sending the molding material to be injected in the next cycle toward the head of the heating barrel 41 to prepare the molding material (S51).

At that time, the control unit 8 drives the measurement servomotor 46 to rotate the screw 42 in the heating barrel 41. The control unit 8 rotates the screw 42 at a predetermined number of rotations, thereby sending a predetermined amount of the melted and kneaded molding material toward the head of the heating barrel 41. Along therewith, the molding material before melting is introduced from the hopper 45 into the heating barrel 41 by rotation of the screw 42.

The mold opening step is a step of separating the moving mold 12 away from the fixed mold 11 to take out the molded product (S61). At that time, the control unit 8 drives the clamping servomotor 21, thereby moving the moving mold 12 in a direction away from the fixed mold 11.

The extruding step is a step of extruding the product from the moving mold 12 with the head portion of the ball screw 72 to take out the product from the moving mold 12 (S71). At that time, the control unit 8 drives the extrusion servomotor 71, thereby moving the ball screw 72 in a direction toward the moving mold 12. The product adhering to the internal surface of the moving mold 12 is extruded with the head portion of the ball screw 72 and taken out. The injection molding machine 1 performs the injection and molding operation in this way.

According to the first embodiment, when the moving mold 12 and the fixed mold 11 are to be spaced apart by the predetermined interval Ds, the control unit 8 rotates the motor 21 by as much as (Es+ΔE) or (Es+ΔE+Eα) from a state where the moving mold 12 and the fixed mold 11 are in contact with each other and then returns the motor 21 by as much as the operation loss ΔE or (ΔE+Eα). By rotating the motor 21 by as much as (Es+ΔE) or (Es+ΔE+Eα), the interval between the moving mold 12 and the fixed mold 11 can be set to a value equal to or larger than the desired interval (the set interval) Ds. Furthermore, by returning the motor 21 by as much as the operation loss ΔE or (ΔE+Eα), the interval between the moving mold 12 and the fixed mold 11 is not enlarged and is kept at the desired interval Ds during filling of a resin. As a result, the injection molding machine 1 can accurately control the opening amount of the molds without requiring any special mechanism or apparatus added thereto.

In the first embodiment, the operation or the position of the motor 21 indicates a rotational operation or a rotational position. However, the operation or the position of the motor 21 can be a linear operation or a linear position, for example, as in a linear motor.

Second Embodiment

In a second embodiment, the control unit 8 detects the operation loss ΔE based on a torque T or a consumed power P of the motor 21. The configuration of the injection molding machine 1 according to the second embodiment can be identical to those shown in FIG. 1 to FIG. 3.

Calculation of the operation loss ΔE according to the second embodiment is explained below.

(Calculation of Operation Loss ΔE)

Figure 8A:
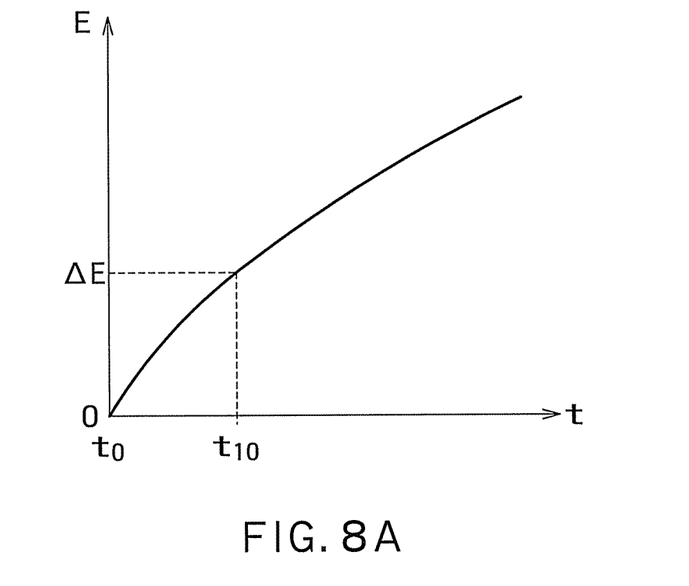
FIG. 8A is a graph showing the detection value E of the encoder ENC of the motor 21.
Figure 8B:
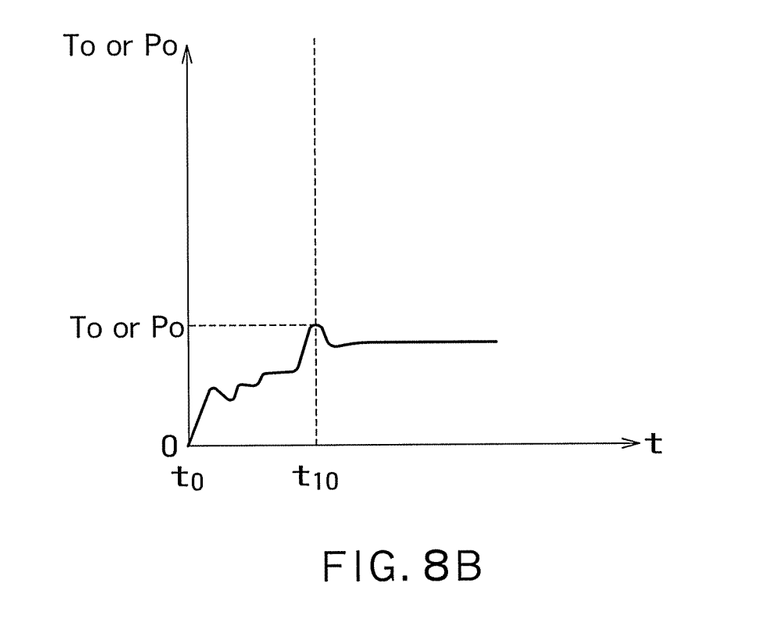
FIG. 8B is a graph showing the torque T or the consumed power P of the motor 21.
Figure 9:
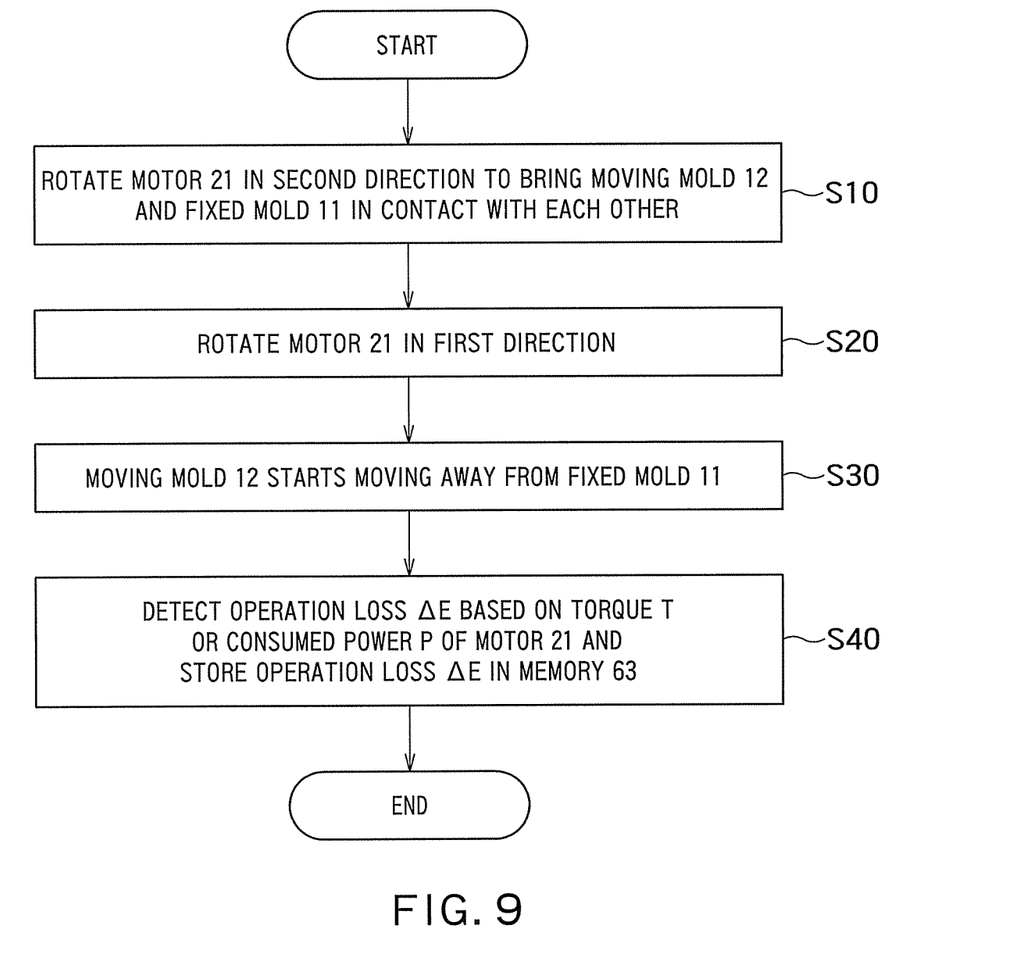
FIG. 9 is a flowchart showing a calculation operation of the operation loss ΔE.

FIG. 8A is a graph showing the detection value E of the encoder ENC of the motor 21. FIG. 8B is a graph showing the torque T or the consumed power P of the motor 21. FIG. 9 is a flowchart showing a calculation operation of the operation loss ΔE.

Generally, to move the moving mold 12 to a desired position, the control unit 8 sets a rotation position (an angle, for example) of the motor 21 with a position instruction. The motor 21 receives a power from a power supply and rotates according to the position instruction. The toggle mechanism 13 moves the moving mold 12 with the operation of the motor 21. The control unit 8 monitors the torque T or the consumed power P of the motor 21.

The motor 21 is first rotated in the second direction to obtain a state (E=0, T or P=0) where the moving mold 12 and the fixed mold 11 are in contact with each other (t0, S10). At that time, the toggle pins T1 to T4 are in the state shown in FIG. 2.

Next, after t0, the motor 21 is rotated in the first direction (S20). Because the motor 21 starts the operation, the detection value E of the encoder ENC gradually increases as shown in FIG. 8A.

However, the operation of the moving mold 12 is delayed by as much as the operation loss ΔE. Therefore, at the time of a start of the operation of the motor 21, the torque T or the consumed power P of the motor 21 gently increases.

At t10, the moving mold 12 starts the operation and starts moving away from the fixed mold 11 (S30). At that time, the toggle pins T1 to T4 are in the state shown in FIG. 3. When the moving mold 12 starts operating, a load of the moving mold 12 is applied to the motor 21. Therefore, as shown in FIG. 8B, the torque T or the consumed power P of the motor 21 has a peak value T0 or P0 at the operation start time t10 of the moving mold 12. The detection value E of the encoder ENC from the operation start (t0) of the motor 21 to the operation start (t10) of the moving mold 12 at that time is the operation loss ΔE of the motor 21.

Thereafter, the detection value E of the encoder ENC increases. Meanwhile, the torque T or the consumed power P of the motor 21 is kept almost constant during movement of the moving mold 12.

As described above, according to the second embodiment, the control unit 8 can detect the operation loss ΔE based on the torque T or the consumed power P of the motor 21. The operation loss ΔE is stored in the memory 63 (S40).

The injection and molding operation of the injection molding machine 1 according to the second embodiment can be identical to those shown in FIG. 5 and FIG. 7.

According to the second embodiment, the control unit 8 calculates the operation loss ΔE occurring from the operation start of the motor 21 to the operation start of the moving mold 12 based on the torque T or the consumed power P of the motor 21. For example, an operation amount of the motor 21 until the time t10 when the torque T or the consumed power P of the motor 21 becomes a peak after the operation of the motor 21 starts is set as the operation loss ΔE. In this way, the control unit 8 can automatically calculate the operation loss ΔE. An operator does not need to actually measure the interval between the moving mold 12 and the fixed mold 11 and to input the measured interval to the HMI/F 60.

According to the second embodiment, when the moving mold 12 and the fixed mold 11 are to be spaced apart from each other by the predetermined interval Ds, the control unit 8 rotates the motor 21 by as much as (Es+ΔE) or (Es+ΔE+Eα) from the state where the moving mold 12 and the fixed mold 11 are in contact with each other and then returns the motor 21 by as much as the operation loss ΔE or (ΔE+Eα). By rotating the motor 21 by as much as (Es+ΔE) or (Es+ΔE+Eα), the interval between the moving mold 12 and the fixed mold 11 can be set to a value equal to or larger than the desired interval (the set interval) Ds. Furthermore, by returning the motor 21 by as much as the operation loss ΔE or (ΔE+Eα), the interval between the moving mold 12 and the fixed mold 11 is not enlarged and is kept at the desired interval Ds during filling of a resin. As a result, the injection molding machine 1 can accurately control the opening amount of the molds without requiring any special mechanism or apparatus added thereto.

Also in the second embodiment, the operation or the position of the motor 21 indicates a rotational operation or a rotational position. However, the operation or the position of the motor 21 can be a linear operation or a linear position, for example, as in a linear motor.

The invention claimed is:

1. A molding machine comprising:
   a fixed platen constructed and arranged to have a fixed mold attached thereto;
   a moving platen constructed and arranged to have a moving mold attached thereto;
   a mold clamping mechanism constructed and arranged to clamp the moving mold and the fixed mold with each other by moving the moving mold;
   a driving unit operating the mold clamping mechanism; and
   a control unit controlling the driving unit, wherein
   the control unit compensates an operation loss of the driving unit occurring from an operation start of the driving unit to an operation start of the moving mold to set the moving mold at a desired position,
   when the moving mold and the fixed mold are to be spaced apart by an interval Ds, the control unit operates the driving unit by as much as (Es+ΔE) or (Es+ΔE+Eα) from a state where the moving mold and the fixed mold are in contact with each other, and then returns the driving unit by as much as the operation loss ΔE or (ΔE+Eα), and
   an operation distance or an operation angle of the driving unit corresponding to the interval Ds is assumed as Es, an operation loss of the driving unit occurring from an operation start of the driving unit to an operation start of the moving mold is assumed as ΔE, and a certain operation distance or a certain operation angle of the driving unit is assumed as Eα.

2. The machine of claim 1, further comprising:
   an input unit inputting an interval between the moving mold and the fixed mold, wherein
   when an actual interval between the moving mold and the fixed mold at a time when the driving unit has operated by a certain distance or angle Ep is Dp, the control unit calculates a distance or angle Ep0 of the driving unit corresponding to the actual interval Dp input by the input unit and calculates a difference (|Ep−Ep0|) between the distance or angle Ep0 and the distance or angle Ep as the operation loss ΔE.

3. The machine of claim 1, further comprising a memory storing the operation loss ΔE.

4. The machine of claim 1, wherein the mold clamping mechanism comprises a toggle mechanism having a plurality of links coupled to one another.

5. The machine of claim 1, wherein the mold clamping mechanism comprises a ball screw moving the moving platen.

6. The machine of claim 1, further comprising an encoder detecting a position or angle of the driving unit.

7. A driving method of a molding machine comprising a fixed platen constructed and arranged to have a fixed mold attached thereto, a moving platen constructed and arranged to have a moving mold attached thereto, a mold clamping mechanism clamping the moving mold and the fixed mold with each other by moving the moving mold, a driving unit operating the mold clamping mechanism, and a control unit controlling the driving unit, the method comprising:

compensating an operation loss of the driving unit occurring from an operation start of the driving unit to an operation start of the moving mold to set the moving mold at a desired position;

when the moving mold and the fixed mold are to be spaced apart by an interval Ds, operating the driving unit by as much as (Es+ΔE) or (Es+ΔE+Eα) from a state where the moving mold and the fixed mold are in contact with each other; and returning the driving unit by as much as the operation loss ΔE or (ΔE+Eα), wherein an operation distance or an operation angle of the driving unit corresponding to the interval Ds is assumed as Es, an operation loss of the driving unit occurring from an operation start of the driving unit to an operation start of the moving mold is assumed as ΔE, and a certain operation distance or a certain operation angle of the driving unit is assumed as Eα.

8. The method of claim 7, wherein when an actual interval between the moving mold and the fixed mold at a time when the driving unit has operated by a certain distance or angle Ep is Dp, the control unit calculates a distance or angle Ep0 of the driving unit corresponding to the actual interval Dp and calculates a difference (|Ep−Ep0|) between the distance or angle Ep0 and the distance or angle Ep as the operation loss ΔE.

9. A molding machine comprising:
a fixed platen constructed and arranged to have a fixed mold attached thereto;
a moving platen constructed and arranged to have a moving mold attached thereto;
a mold clamping mechanism constructed and arranged to clamp the moving mold and the fixed mold with each other by moving the moving mold;
a driving unit operating the mold clamping mechanism; and
a control unit controlling the driving unit, wherein
the control unit calculates an operation loss ΔE of the driving unit occurring from an operation start of the driving unit to an operation start of the moving mold based on a torque T or a consumed power of the driving unit.

10. The machine of claim 9, wherein the control unit sets an operation amount of the driving unit to a time when a torque T or a consumed power of the driving unit becomes a peak after the driving unit starts operating as the operation loss ΔE.

11. The machine of claim 9, wherein when the moving mold and the fixed mold are to be spaced apart by an interval Ds, the control unit operates the driving unit by as much as (Es+ΔE) or (Es+ΔE+Eα) from a state where the moving mold and the fixed mold are in contact with each other, and then returns the driving unit by as much as the operation loss ΔE or (ΔE+Eα), wherein an operation distance or an operation angle of the driving unit corresponding to the interval Ds is assumed as Es, an operation loss of the driving unit occurring from an operation start of the driving unit to an operation start of the moving mold is assumed as ΔE, and a certain operation distance or a certain operation angle of the driving unit is assumed as Eα.

12. The machine of claim 9, further comprising a memory storing the operation loss ΔE.

13. The machine of claim 9, wherein the mold clamping mechanism comprises a toggle mechanism having a plurality of links coupled to one another.

14. The machine of claim 9, wherein the mold clamping mechanism comprises a ball screw moving the moving platen.

15. The machine of claim 9, further comprising an encoder detecting a position or angle of the driving unit.

16. A driving method of a molding machine comprising a fixed platen constructed and arranged to have a fixed mold attached thereto, a moving platen constructed and arranged to have a moving mold attached thereto, a mold clamping mechanism constructed and arranged to clamp the moving mold and the fixed mold with each other by moving the moving mold, a driving unit operating the mold clamping mechanism, and a control unit controlling the driving unit, the method comprising:

calculating an operation loss ΔE of the driving unit occurring from an operation start of the driving unit to an operation start of the moving mold based on a torque T or a consumed power of the driving unit;

when the moving mold and the fixed mold are to be spaced apart by an interval Ds, operating the driving unit by as much as (Es+ΔE) or (Es+ΔE+Eα) from a state where the moving mold and the fixed mold are in contact with each other; and returning the driving unit by as much as the operation loss ΔE or (ΔE+Eα), wherein an operation distance or an operation angle of the driving unit corresponding to the interval Ds is assumed as Es, an operation loss of the driving unit occurring from an operation start of the driving unit to an operation start of the moving mold is assumed as ΔE, and a certain operation distance or a certain operation angle of the driving unit is assumed as Eα.

17. The method of claim 16, wherein when an actual interval between the moving mold and the fixed mold at a time when the driving unit has operated by a certain distance or angle Ep is Dp, the control unit calculates a distance or angle Ep0 of the driving unit corresponding to the actual interval Dp and calculates a difference (|Ep−Ep0|) between the distance or angle Ep0 and the distance or angle Ep as the operation loss ΔE.

* * * * *